(12) United States Patent
Chen et al.

(10) Patent No.: US 8,964,527 B2
(45) Date of Patent: *Feb. 24, 2015

(54) MAINTAINING A COMMUNICATION PATH FROM A HOST TO A STORAGE SUBSYSTEM IN A NETWORK

(75) Inventors: Lei Chen, Shanghai (CN); Shu Yang, Shanghai (CN); Dong Hai Yu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 226 days.

This patent is subject to a terminal disclaimer.

(21) Appl. No.: 13/454,803

(22) Filed: Apr. 24, 2012

(65) Prior Publication Data

US 2012/0233491 A1 Sep. 13, 2012

Related U.S. Application Data

(63) Continuation of application No. 13/099,191, filed on May 2, 2011, now Pat. No. 8,644,132.

(30) Foreign Application Priority Data

May 31, 2010 (CN) .......................... 2010 1 0192361

(51) Int. Cl.
*G01R 31/08* (2006.01)
*H04L 12/703* (2013.01)
(Continued)

(52) U.S. Cl.
CPC .............. *H04L 45/28* (2013.01); *H04L 49/357* (2013.01); *H04L 49/557* (2013.01); *H04L 49/70* (2013.01); *H04L 67/1097* (2013.01); *H04L 69/40* (2013.01)
USPC ................................ 370/217; 714/3; 709/227

(58) Field of Classification Search
CPC .. H04L 49/357; H04L 49/557; H04L 67/1097
USPC ....................................... 370/216, 217; 714/3
See application file for complete search history.

(56) References Cited

U.S. PATENT DOCUMENTS

| 6,775,230 B1 | 8/2004 | Watanabe et al. |
| 6,968,401 B2 | 11/2005 | McBrearty et al. |

(Continued)

FOREIGN PATENT DOCUMENTS

| CN | 1778076 | 5/2006 |
| CN | 1902578 | 1/2007 |
| CN | 101047594 | 10/2007 |
| CN | 101213818 | 7/2008 |
| EP | 2 112 589 | 10/2009 |
| EP | 2112589 | 10/2009 |

OTHER PUBLICATIONS

"Hitachi HiCommand Global Link Availability Manager Software", Hitachi Data Systems, pp. 1-4, Apr. 2006.

(Continued)

*Primary Examiner* — Donald Mills
*Assistant Examiner* — Henry Baron
(74) *Attorney, Agent, or Firm* — David W. Victor; Konrad Raynes Davda & Victor LLP (57) ABSTRACT

Provided are a method, system, computer storage device, and storage area network for maintaining a communication path from a host to a storage subsystem in a network. A storage subsystem controls data transfer and access to a storage devices in a network including a switch and a host. A topological storage stores topological coupling relationship between the host and the switch and a topological coupling relationship between the switch and the storage subsystem. In response to determining a failed path, the storage subsystem determines a first port on the storage subsystem in the failed path. The storage subsystem determines from the topology storage the topological coupling relationships between the host and the switch and the switch and the storage subsystem. The storage subsystem redirects, based on the topological coupling relationships, a message sent to the first port of the storage subsystem to an operational second port in the storage subsystem.

8 Claims, 7 Drawing Sheets

(51) Int. Cl.
*H04L 12/931* (2013.01)
*H04L 12/939* (2013.01)
*H04L 29/08* (2006.01)
*H04L 29/14* (2006.01)

(56) References Cited

U.S. PATENT DOCUMENTS

| | | | |
|---|---|---|---|
| 7,210,068 B1 | 4/2007 | Aiello et al. | |
| 7,430,164 B2 | 9/2008 | Bare | |
| 7,499,410 B2 | 3/2009 | Dutt et al. | |
| 7,596,616 B2 | 9/2009 | Yamamoto et al. | |
| 7,599,397 B2 | 10/2009 | Holland | |
| 7,619,979 B2 | 11/2009 | Phelan et al. | |
| 7,711,978 B1 | 5/2010 | Roy et al. | |
| 7,739,415 B2 | 6/2010 | Banzhaf et al. | |
| 7,757,007 B2 | 7/2010 | Banzahf et al. | |
| 7,770,208 B2 | 8/2010 | Barnett et al. | |
| 7,836,332 B2 | 11/2010 | Hara et al. | |
| 8,050,261 B2 * | 11/2011 | Sabaa et al. | 370/389 |
| 8,099,525 B2 | 1/2012 | Nicholson et al. | |
| 2002/0194294 A1 | 12/2002 | Blumenau et al. | |
| 2003/0126315 A1 | 7/2003 | Tan et al. | |
| 2004/0054866 A1 | 3/2004 | Blumenau et al. | |
| 2005/0195736 A1 * | 9/2005 | Matsuda | 370/216 |
| 2007/0055737 A1 | 3/2007 | Yamashita et al. | |
| 2008/0112311 A1 | 5/2008 | Hariharan et al. | |
| 2008/0225877 A1 | 9/2008 | Yoshida | |
| 2009/0025007 A1 * | 1/2009 | Hara et al. | 718/105 |
| 2009/0157846 A1 | 6/2009 | Shimozono et al. | |
| 2009/0307444 A1 * | 12/2009 | Cyr et al. | 711/154 |
| 2011/0090816 A1 | 4/2011 | Dutt et al. | |
| 2011/0296230 A1 | 12/2011 | Chen et al. | |
| 2014/0108666 A1 | 4/2014 | Chen et al. | |

OTHER PUBLICATIONS

"Fibre Channel Generic Services—5 (FC-GS-5)", INCITS, T11/Project 1677-D/Rev. 8.5, Jul. 10, 2006, pp. 1-372.

"Fibre Channel Framing and Signaling—3 (FC-FS-3)", INCITS, T11/Project 1861-D/Rev. 0.90, Aug. 6 2006, pp. 1-409.

S.J. Bigelow, "SAN Availablility and Reliability", Sep. 26, 2007, pp. 1, [online] http://searchstorage.techtarget.com/generic/0,295582,sid5_gci1274128,00 . . . .

"Multipath Subsystem Device Driver User's Guide", IBM Corporation, Document No. GC27-2122-00, 2007, pp. 1-485.

Fibre Channel Device Attach—2(FC-DA-2) Rev. 1.04, INCITS Working Draft, T11/Project 1870-DT, Nov. 3, 2008, pp. 1-78.

Fibre Channel Link Services (FC-LS-2) Rev. 2.11, INCITS Working Draft, T11/Project 21103-D, May 7, 2009, pp. 1-211.

PCT International Search Report and Written Opinion dated Nov. 22, 2011 for Application No. PCT/EP2011/058434 filed May 24, 2011 (11 pages).

Notice of Allowance dated Sep. 23, 2013, pp. 1-24, for U.S. Appl. No. 13/099,191, filed May 2, 2011.

Prelim Amendment filed Apr. 24, 2012, for U.S. Appl. No. 13/099,191, filed May 2, 2011 by inventor Chen et al.

Office Action dated Mar. 15, 2013, pp. 1-29, for U.S. Appl. No. 13/099,191, filed May 2, 2011 by inventor Chen et al.

Response dated Jun. 4, 2013, pp. 1-15, to Office Action dated Mar. 15, 2013, pp. 1-29, for U.S. Appl. No. 13/099,191, filed May 2, 2011 by inventor Chen et al.

Chinese Office Action dated May 29, 2013 for Serial No. 201010192361.2, filed May 31, 2010.

Information Materials for IDS dated Jun. 4, 2013 for Chinese Office Action dated May 29, 2013 for Serial No. 201010192361.2, filed May 31, 2010.

English Translation of CN1778076 May 24, 2006 Cisco Tech Ind.

English Translation of CN1902578 Jan. 24, 2007 Nicholson et al.

English Translation of CN101047594 Oct. 3, 2007 Barnett et al.

English Translation of CN101213818 Jul. 2, 2008 IBM Corp.

Final Office Action dated Mar. 15, 2013, pp. 1-24, for U.S. Appl. No. 13/099,191, filed May 2, 2013 by inventor Chen et al.

Response dated Sep. 9, 2013, pp. 12, to Final Office Action dated Mar. 15, 2013, pp. 1-24, for U.S. Appl. No. 13/099,191, filed May 2, 2011 by inventor Chen et al.

Preliminary Remarks dated Dec. 12, 2013, pp. 2, for U.S. Appl. No. 14/105,053, filed Dec. 12, 2013.

Taiwanese Office Action dated Nov. 18, 2014, pp. 10, for Application Serial No. 100112067, filed Apr. 7, 2011.

Taiwanese Office Action dated Nov. 18, 2014, for Application Serial No. 100112067, filed Apr. 7, 2011.

* cited by examiner

Fig.1

(Prior Art)

MAINTAINING A COMMUNICATION PATH FROM A HOST TO A STORAGE SUBSYSTEM IN A NETWORK

CROSS-REFERENCE TO RELATED FOREIGN APPLICATION

This application is a non-provisional application that claims priority benefits under Title 35, Unites States Code, Section 119(a)-(d) from Chinese Patent Application entitled "KEEPING A COMMUNICATION PATH SMOOTH IN A STORAGE AREA NETWORK" by Shu YANG, Lei CHEN, and Dong Hai YU, having Chinese Patent Application Serial No. CN201010192361.2, filed on May 31, 2010, which application is incorporated herein by reference in its entirety.

BACKGROUND

1. Field of the Invention

The present invention relates to a method, system, computer storage device, and storage area network for maintaining a communication path from a host to a storage subsystem in a network.

2. Related Art

A Storage Area Network (SAN) is a high speed communication network or a subnetwork, aiming to provide data transfer between a server and a storage system. As a solution for configuring networked storage, SAN establishes coupling between a server and a storage device through a dedicated Fiber Channel switch, and the simplest coupling is a connection relationship. SAN allows real isolation of the storage device from the server, such that storage becomes a resource that can be shared among all servers. The storage device in SAN is one or more disk devices for storing computer data. These disks generally refer to a disk array, which is also called a storage subsystem. SAN allows cooperation between respective storage subsystems without a dedicated intermediate server. The interfaces of SAN generally include SAS, SATA, SCSI, iSCSI, FICON/ESCON, and Fiber Channel (FC).

Figure 1:
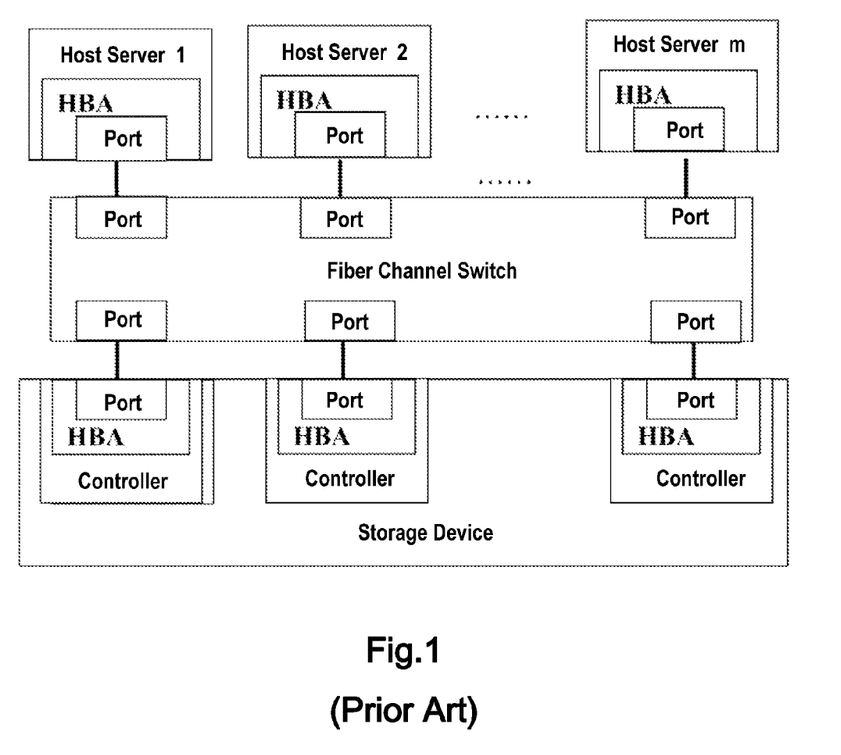
FIG. 1 schematically illustrates a block diagram of the architecture of SAN.

FIG. 1 schematically illustrates a block diagram of the architecture of SAN. According to FIG. 1, a plurality of host servers are coupled to a disk array through a Fiber Channel switch. The Fiber Channel coupling is a high bandwidth backbone to satisfy a sharing storage environment in SAN (connectors like a relay network possibly exist there between, which are not illustrated in FIG. 1). A Fiber Channel has become an industrial standard for SAN interfaces. In the Fiber Channel, a host bus adaptor (HBA) card is a physical connection device between an I/O channel inside a host server and an I/O channel of a storage system. The most common I/O channels inside a server are PCI series and Sbus, while an HBA card functions to convert data transfer from an internal channel protocol PCI or Sbus to a Fiber Channel protocol. With an HBA card inserted, a host server or storage server may be coupled to a disk supporting a Fiber Channel via a Fiber Channel switch. All communications are performed via the HBA card at the host server, the Fiber Channel switch, and a corresponding Fiber Channel port on the storage device. A port (N port) of the host server is generally coupled to a port (F port) of the Fiber Channel switch and the port (F port) of the Fiber Channel switch is coupled to a port (N port) of a storage device via Fiber Channel so as to form a physical data link. However, Fiber Channel protocol criteria allow one N port (N_Port) to obtain a plurality of FC IDs from a Fiber Channel fabric, such that it is possible to establish a plurality of independent logic data links between a node and a Fiber Channel switch. In SAN, servers at different platforms may access the same storage device or a plurality of storage devices. SAN enables storage devices not to be affiliated to a certain server any more, but to be directly connected to the network to form a storage area network, thereby improving the utilization efficiency of storage. Storage controllers of the storage subsystem in FIG. 1 control data transfer and access on the storage device and are generally divided into two parts: a front end and a back end. The front end of the storage controller is to communicate with a host, a Fiber Channel switch, or other device via one or more ports, while the back end is for inter-communication with the disk array under its management. To improve performance and reliability, a storage subsystem may have one or more storage controllers.

As illustrated in FIG. 1, each host server is coupled to the disk array via a single physical path; therefore, an error of single-point coupling failure may easily occur.

A multi-path input/output (MPIO) solution establishes a backup physical transfer path between a server and a storage device using redundancy components (an adaptor, a fiber cable, and a switch, etc.). If one or more of these components fail and cause the path to be unavailable, multi-path control software may leverage the backup path to guarantee the accessibility of an application to its data.

Figure 2A:
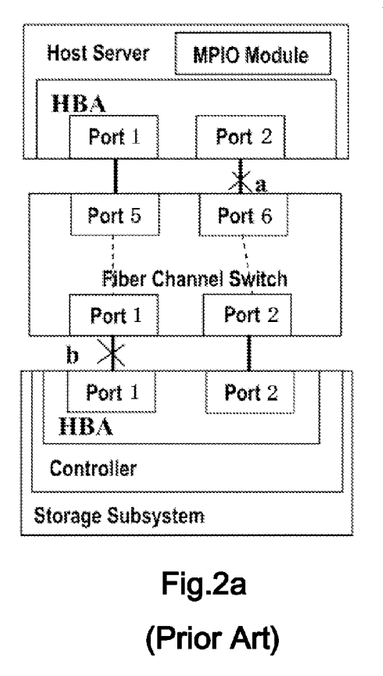
FIGS. 2a and 2b illustrate two simplified diagrams of multi-path solutions and the problems existing therein.

FIG. 2a illustrates a simplified diagram of the multi-path solution and a problem existing in this solution. In the solution, ports 1 and 2 on the HBA card of the host server are connected to ports 5 and 6 on the Fiber Channel switch, respectively, while ports 1 and 2 on the Fiber Channel switch are connected to port 1 on the HBA card and port 2 on the HBA card of the storage subsystem, respectively. Suppose port 1 on the HBA card of the host server inter-communicates with port 1 on the HBA card of the storage subsystem, port 2 on the HBA card of the host server inter-communicates with port 2 on the HBA card of the storage subsystem (generally, it is implemented via zones in a Fiber network management), and the host server comprises an MPIO module provided by a manufacturer. During the process of active/passive I/O data transfer, if there is a problem with primary path a, physical links still exist from port 1 on the HBA card of host server to port 5 and from port 1 of the Fiber Channel switch and to port 1 of the HBA card on the storage subsystem. The existing MPIO may also perform communication between the host server and the storage subsystem, thereby realizing enhanced storage redundancy and dynamic I/O load balance.

However, if there are problems with both primary path a and path b, then the existing MPIO module would be unable to handle this situation; as a result, the communication between the host server and the storage subsystem will be completely disconnected.

Figure 2B:
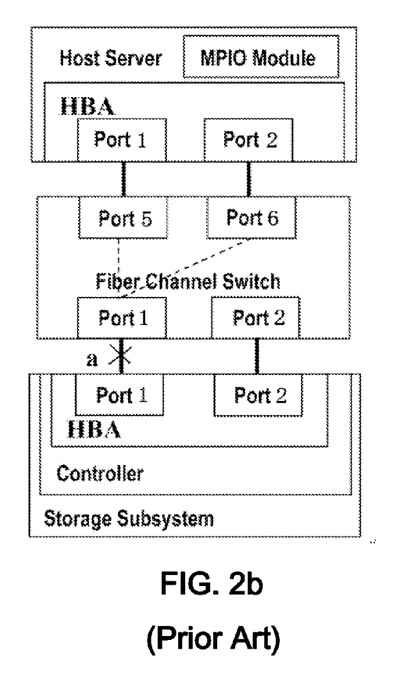

FIG. 2b illustrates another example of a problem existing in the multi-path solution. In this solution, port 1 and port 2 of the HBA at the host server are connected to port 5 and port 6 of the Fiber Channel fabric, respectively, and the host can only inter-communicate with port 1 of the HBA at the storage subsystem via port 1 of the Fiber Channel fabric. If there is a problem path a, the existing MPIO module would be unable to handle this situation; as a result, the communication between the host server and the storage subsystem will be completely disconnected.

SUMMARY

Therefore, a method and a system are needed, which can maintain communication between a host server and a storage subsystem in the above circumstances, thereby improving the communication redundancy of SAN.

According to one embodiment, there is provided a storage area network, at least comprising a host server, a Fiber Channel switch, and a storage subsystem, wherein the Fiber Channel switch is coupled to the host server and the storage subsystem, respectively, the storage subsystem further comprising:

a topological storage coupled to the host server, the Fiber Channel switch and the storage subsystem, respectively, for storing a topological coupling relationship between the host server and the Fiber Channel switch and a topological coupling relationship between the Fiber Channel switch and the storage subsystem;

wherein the storage subsystem further comprises a storage port management module for:

in response to a coupling path failure that occurs between the storage subsystem and the Fiber Channel switch coupled to the storage subsystem, obtaining a port, having a failure, on the storage subsystem, the port being a first port;

obtaining from the topology storage the topological coupling relationship between the host server and the Fiber Channel switch and the topological coupling relationship between the Fiber Channel switch and the storage subsystem; and redirecting, based on the topological coupling relationships, a message sent to the first port of the storage subsystem to another port coupled to the Fiber Channel switch in the storage subsystem.

According to another embodiment, there is provided a method of keeping a communication path smooth in a storage area network, wherein the storage area network at least comprises a host server, a Fiber Channel switch, and a storage subsystem, the Fiber Channel switch being coupled to the host server and the storage subsystem, respectively, the method comprising:

in response to a coupling path failure that occurs between the storage subsystem and the Fiber Channel switch coupled to the storage subsystem, obtaining a port, having a failure, on the storage subsystem, the port being a first port;

obtaining a topological coupling relationship between the host server and the Fiber Channel switch and a topological coupling relationship between the Fiber Channel switch and the storage subsystem; and redirecting, based on the topological coupling relationships, a message sent to the first port of the storage subsystem to another port coupled to the Fiber Channel switch in the storage subsystem.

BRIEF DESCRIPTION OF THE DRAWINGS

The above and other objectives, features and advantages of the present invention will become more apparent through more detained description of the preferred embodiments of the present invention as illustrated in the drawings, where like reference signs typically represent the same components in the preferred embodiments of the present invention.

DETAILED DESCRIPTION

Hereinafter, the preferred embodiments of the present invention will be described in more detail with reference to the accompanying drawings where the preferred embodiments of the present invention are illustrated. However, the present invention may be implemented in various manners and should not be understood as being limited by the embodiments depicted herein. On the contrary, these embodiments are provided to make the present invention much clearer and more complete and to completely show the scope of the present invention to the skilled in the art.

During Fiber Channel communication between a server and a storage subsystem, a transmit frame comprises address identifiers that identify a transmit port address (N port) of a host and a receiving port (N port) address of the storage subsystem. The N port address is unique in a network area of a Fiber Channel switch. Data transfer between devices nodes is based on the N port address.

In implementation of a storage network, the Fiber Channel switch provides automatic (dynamic) address assignment to all Fiber Channel switch ports (F ports) during the initialization process. During the logon process from the host server N port to the Fiber Channel switch, the N port obtains a corresponding Fiber Channel switch port address for the first time. Because two N ports must register with each other before data transfer, such N port registration allows two N ports to establish a session for exchanging definitions and service parameters. The intercommunication and visibility between devices inside the Fiber Channel switch are defined through Fiber Channel zoning. By Fiber Channel zoning, a certain port of a host is allowed only to interconnect with one or several ports on the storage device; meanwhile, the same port may exist in different zones to access different devices. A member of each zone may be WWN of the port or a port number on the Fiber Channel switch. A zone set, also called zone configuration, comprises one or more zones. Each Fiber Channel fabric may have a plurality of zone configurations, but only one is effective in determining the current access policy.

Figure 3:
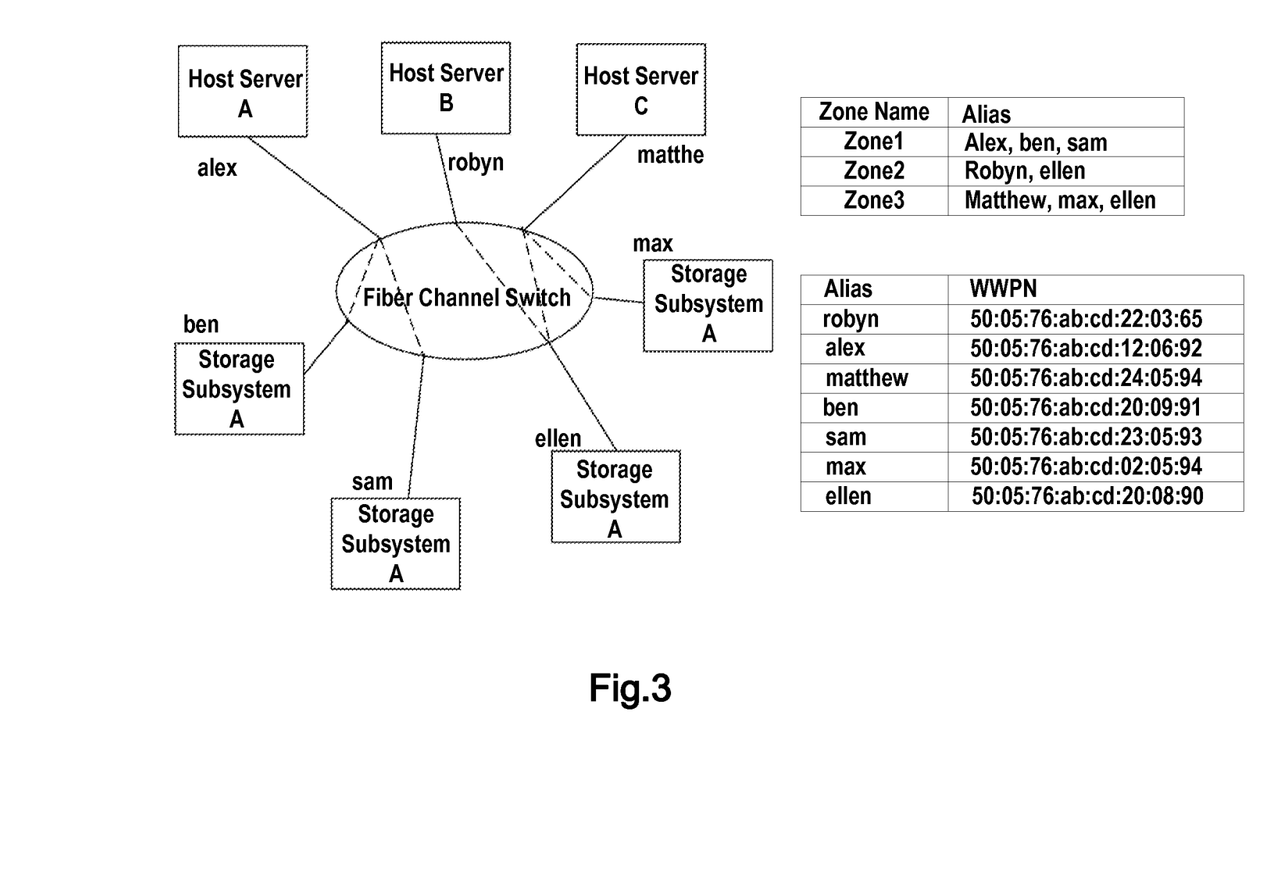
FIG. 3 schematically illustrates a kind of Fiber Channel zoning.

FIG. 3 schematically illustrates an embodiment of Fiber Channel zoning. In the example of FIG. 3, three WWPN-based zones form a zone set, i.e., zone 1, zone 2, and zone 3; the three zones may be in the same valid zone configuration. Zone 1 defines one port of the host server to ports on two different storage systems, where the port at the host side is also called an initiator or transmitting port, while the ports of the storage device available for the host to access are also called targets or receiving ports; and an initiator and a target form a path.

When a host server logs on to the Fiber Channel server, it will register itself to a name server of the Fiber Channel switch. The Fiber Channel name server is responsible for the directory information for the devices that are coupled to the Fiber Channel switch, and maintains the name and address information for the devices that are coupled to the Fiber Channel switch in a complex and dynamic environment. The name server comprises all coupled devices and their relevant attributes, for example, type (N or NL), class of service, port address (port identifier), unique port name (Port WWN), unique node name (Node WWN), FC-4 supported type, and device symbol name (symbolic port name). The host server may query all devices in the Fiber Channel fabric through the name server of a Fiber Channel switch. The name server will respond to the devices by simulating a normal N port. Although the name server knows all devices in the Fiber Channel fabric, it will not tell all of them to the inquirer but only returns as a query result the devices that belong to the same zone as the host, while other devices not in the zone will be hidden by the name server so that the host server will not know existence of these devices.

The NPIV (N_Port ID Virtualization) technology is used to improve the communication redundancy of a SAN, which was initially implemented by International Business Machines Corporation and Emulex Corporation on their mainframes and then defined by T11 Fiber Channel Workgroup in the International Committee for Information Technology (INCITS) as a portion of Fiber Channel Link Services (FC-LS) standards. Based on this protocol, the connection port for coupling the host side to the Fiber Channel switch, i.e., one N port, may be virtualized into a plurality of N_Port IDs on the same physical port. The formulation of NPIV is initially designed for a virtualization environment such that different virtual machines may correspond to different N_Port IDs so as to separate the coupling of different virtual machines with the SAN environment, thereby improving the flexibility and security of the network. Each virtual machine uses different WWPN to register with the Fiber Channel fabric through a shared physical N port and to obtain an independent Fiber Channel address. Different Fiber Channel fabric registrations mean each virtual machine may guarantee its independent zoning, security, and transfer management.

In the NPIV mode, N port may obtain different addresses from the registration server through an FDISC command (including extra virtual node and port WWN information) to thereby establish a plurality of independent virtual links. After finishing the Fiber Channel fabric registration service, each N port (including virtual N port) will continuously perform an N port registration once with each N port that is to communicate with the former N port in the network, with communication service parameters being exchanged.

The NPIV technology may be first employed to improve an existing MPIO module at the host side, such that the existing MPIO module implements functions of port virtualization and migration using the NPIV protocol. In the scenario of FIG. 2a, when port 2 of the host server has a failure in a relevant physical link, other port 3 is virtualized on port 1 of the host server that is in the same zone as port 2 by the MPIO module supporting the NPIV protocol, and then communicates with the storage subsystem via the port 3. In this way, when the primary path a fails, the MPIO module supporting the NPIV protocol can automatically create an additional virtual path for I/O transmission. Based on different I/O transmission policies, this additional virtual path may become a "backup path" for the original backup path. Once the failure at location b causes the original backup path suspending serving, the virtual "backup path" may take the place and perform I/O switch. In other words, the MPIO module at the host side may, in response to a coupling failure between a certain port of the host server and a port of the Fiber Channel switch, a certain virtual port is virtualized on other port on the host server coupled to the same Fiber Channel fabric as the certain port, the certain virtual port being equivalent to the certain port; and the certain virtual port on the host is used to communication with other port of the Fiber Channel switch.

Further, even the improved MPIO cannot solve the problem that both path a and path b have failures as illustrated in FIG. 2a or the problem of inability to communicate between the host server and the storage subsystem caused by failure of path a as illustrated in FIG. 2b. This invention finds the cause for these problems through analysis. That is, although the MPIO module at the host server side may control a plurality of paths for data transfer, the number of valid redundant paths must drop with occurrence of the failure of physical links. Particularly at the storage subsystem side, if a physical link directly associated with a port fails, for example, the physical link between the port and the Fiber Channel switch fails, the storage subsystem will not make active adjustment to the invalidity of the path so as to cooperate with the host for providing an additional path. Thus, it is necessary to further improve the traditional MPIO solution so as to improve the redundancy and load balance for the communication between a host server and a storage subsystem in the overall SAN environment.

In the prior art, a storage subsystem comprises some monitor programs. Through the interfaces of these programs, it may be obtained whether some kinds of coupling failures occur between the storage subsystem and the Fiber Channel switch coupled to the storage subsystem, or a monitor module may be separately developed in the storage subsystem, in order to monitor whether there are coupling failures between the storage subsystem and the Fiber Channel switch coupled to the storage subsystem. Preferably, the monitor module may monitor statistical information regarding the I/O transmission and state of each storage port.

In embodiments of this invention, a storage port management module is further introduced in the storage subsystem. This module may use the NPIV technology to perform storage subsystem port virtualization and port migration.

Figure 4:
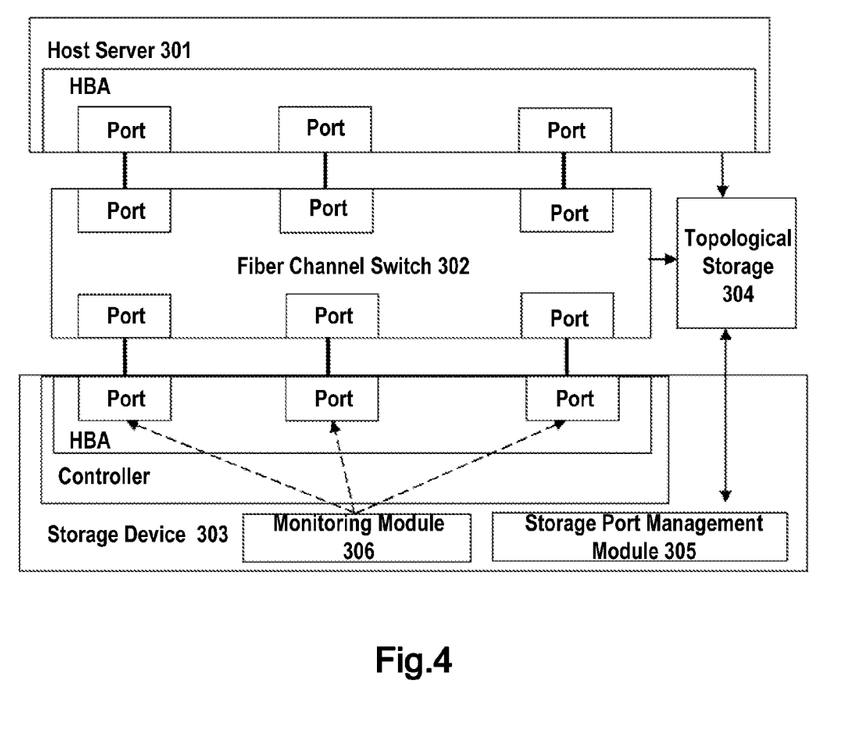
FIG. 4 schematically illustrates a storage area network according to one embodiment of the present invention.

FIG. 4 schematically illustrates a storage area network according to one embodiment of the present invention, which comprises a host server 301, a Fiber Channel switch 302, and a storage subsystem 303, where the Fiber Channel switch 302 is connected to the host server 301 and the storage subsystem 303 respectively, and the system further comprises:

A topology storage 304 connected to the host server 301, the Fiber Channel switch 302, and the storage subsystem 303, respectively, for storing a topological coupling relationship between the host server 301 and the Fiber Channel switch 302 and a topological coupling relationship between the Fiber Channel switch 302 and the storage subsystem 303; wherein the storage subsystem 303 further comprises a storage port management module 305 that, in response to a coupling path failure between the storage subsystem and the coupled Fiber Channel switch, obtains a port, having a failure, on the storage system, the port being a first port, obtains from the topology storage the topological coupling relationship between the host server and the Fiber Channel switch and the topological coupling relationship between the Fiber Channel switch and the storage subsystem, and redirects, based on the topological coupling relationships, a message sent to the first port of the storage subsystem to another port coupled to the Fiber Channel switch in the storage subsystem.

In the above technical solution, the topological coupling relationship preferably further comprises zones of the Fiber Channel switch. The topological coupling relationship may be expressed in a plurality of manners. For example, it may be expressed by a data structure such as a linked list or an array, stored as a file or in a database. The topological storage 304 may be a separate storage device, for example, a disk, a magnetic tape, a CD, etc., or a storage module inside the Fiber Channel switch 302, or a storage module in the storage subsystem, etc.

In one embodiment, the topological storage 304 is disposed in a name server and/or management server of the Fiber Channel switch 302. The name and address information regarding the devices coupled to the Fiber Channel switch as already stored in the name server is exactly a topological coupling relationship between the host server 301 and the Fiber Channel switch 302 and a topological coupling relationship between the Fiber Channel switch 302 and the storage subsystem 303. However, when a topological coupling relationship as stored in the name server itself has a coupling failure, relevant device information will be cleared, and the coupling relationship will lose accordingly. However, an additional topological server may be defined in the name server to store such relevant information, and this additional topological server thereby becomes the topological server 304. In addition, the management server, which may provide more comprehensive information regarding coupling relationship beyond the limitation scope of the zone, may also create the topological storage 304. Meanwhile, the management server may query relevant attributes for a specific coupling device.

In one embodiment, the MPIO module supporting NPIV criteria on the host server further comprises a host registration module, for registering host server port information with the Fiber Channel fabric to establish a corresponding topological relationship, which, preferably, further registers virtualized port information; preferably, the MPIO module may also replace the port experiencing physical link invalidity with an additional port virtualized on the host server port based on a defined migration policy, and establishes a virtual logical link with the Fiber Channel switch.

In another embodiment, the storage subsystem also supports the NPIV protocol to virtualize a first port coupled to the Fiber Channel switch on the storage subsystem into a first virtual port equivalent to the first port; additionally, the storage subsystem supporting NPIV may also comprise a storage subsystem registration module for registering the first port coupled to the Fiber Channel switch on the storage subsystem and the first virtual port as devices coupled to the Fiber Channel switch, so as to establish a corresponding topological relationship. In this way, the topological coupling relationship for the overall storage area network is stored in the name server and/or management server of the Fiber Channel switch. When the topological coupling relationship of the network changes, the host registration module and the storage subsystem registration module must timely report updates to a relevant server of the Fiber Channel switch. Additionally, the topological server will return interfaces of one or more certain ports of the host or storage server in the same zone in response to querying all devices in the Fiber Channel fabric.

In one embodiment, the storage port management module 305 redirects, based on the above coupling relationship, a message sent to a port, having a coupling path failure, in the storage subsystem to another port coupled to the Fiber Channel switch in the storage subsystem, specifically comprising: first, the storage port management module 305, based on the zone where the first port is located in the topologic coupling relationship, obtains a host whose communication is affected and a host port, the host port being a second port; then, obtaining, based on the topological coupling relationship, a third port coupled to the Fiber Channel switch, having no communication failure, in the storage subsystem; next, instructing the topological storage to place the second port and the third port in the same zone; finally, instructing the MPIO module to update path information, i.e., modifying a storage subsystem receiving port (N port) for a transmit frame transmitted to the storage subsystem in the host whose communication is affected to the third port.

In a further embodiment, the storage port management module 305 redirects a message sent to a port, having a coupling path failure, in the storage subsystem to another port coupled to the Fiber Channel switch in the storage subsystem, specifically comprising: first, the storage port management module 306, based on the zone where the first port is located in the topological coupling relationship, obtains a host whose communication is affected and a host port, the host port being a second port; then, obtaining a third port, coupled to the Fiber Channel switch, having no communication failure, in the storage subsystem based on the topological coupling relationship; obtaining other port coupled to the same Fiber Channel fabric with the second port on the affected host, this other port being a fourth port; then instructing the topological storage to determine other port of a storage subsystem end associated with the fourth port based on the coupling relationship of the fourth port, this other port being a fifth port; further instructing the topological storage to establish a zone with the second port and the third port; finally, instructing the MPIO module to modify the storage subsystem receiving port (N port) for a transmit frame sent to the first port of the storage subsystem in the host whose communication is affected into the third port.

In one embodiment, a plurality of third ports having no communication failure may exist. According to such embodiment, any one of the qualified ports is selected as the third port or a port with minimal traffic is selected as the third port; in another embodiment, in order to maintain the current host, storage subsystem, and configurations defined on the Fiber Channel fabric, the storage subsystem supporting NPIV may also be virtualized out a port on the selected port (any qualified port or a port with minimal traffic), this virtualized port being the third port.

Figure 5:
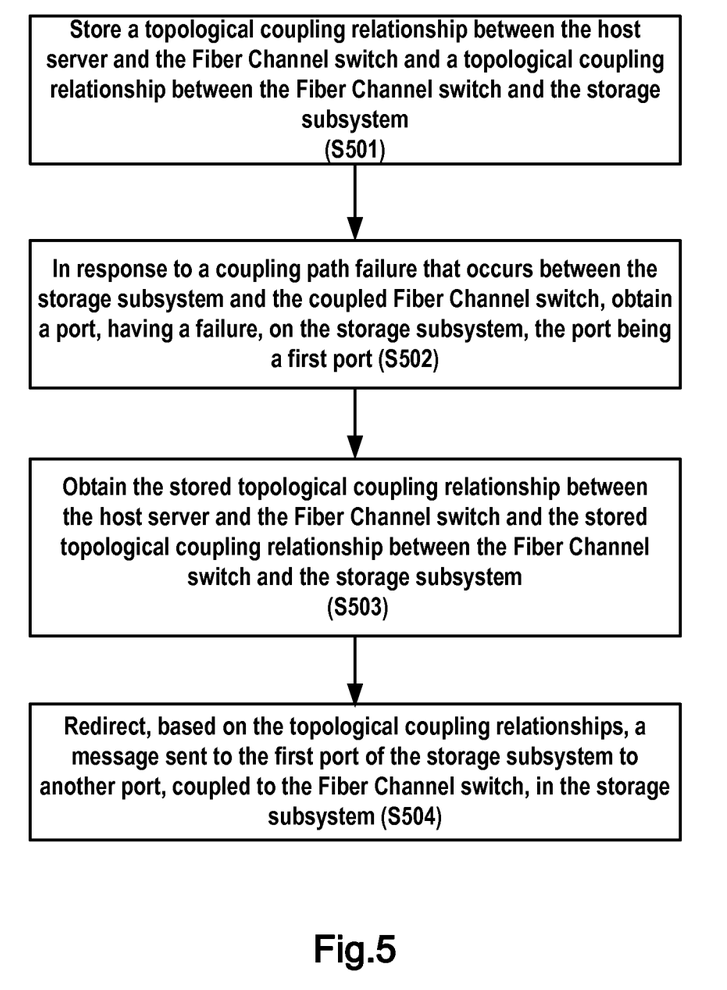
FIG. 5 schematically illustrates a flowchart of a method of keeping communication path smooth in a storage area network.

Further embodiments concern a method of keeping a communication path smooth in a storage area network, with a flowchart illustrated in FIG. 5, wherein the storage area network at least comprises a host server, a Fiber Channel switch, and a storage subsystem, the Fiber Channel switch being coupled to the host server and the storage subsystem, respectively. The method comprises:

At step S501, storing a topological coupling relationship between the host server and the Fiber Channel switch and a topological coupling relationship between the Fiber Channel switch and the storage subsystem. This storing step is an optional step and not essential, because the topological coupling relationship might be pre-stored or deployed in a relevant device in other manner. At step S502, in response to a coupling path failure between the storage subsystem and the coupled Fiber Channel switch, obtaining a port, having a failure, on the storage subsystem, the port being a first port; at step S503, obtaining a stored topological coupling relationship between the host server and the Fiber Channel switch and a stored topological coupling relationship between the Fiber Channel switch and the storage subsystem; at step S504, redirecting a message transmitted to the first port of the storage subsystem to another port that is coupled to the Fiber Channel switch in the storage subsystem.

In a preferred embodiment, in response to a coupling failure between a certain port of the host server and a port of the Fiber Channel switch, a certain virtual port is virtualized on other port of the host server coupled to the same Fiber Channel fabric as the certain port, the certain virtual port being equivalent to the certain port; the certain virtual port on the host is used to communicate with other port of the Fiber Channel switch.

For monitoring a port failure, on one hand, it is possible to directly monitor whether a coupling failure occurs between the storage subsystem and the Fiber Channel switch coupled to the storage subsystem. This step may be performed before step S502.

In one embodiment, the storage subsystem supports the NPIV protocol, and the method as illustrated in FIG. 5 further comprises the following steps: virtualizing a first port coupled to the Fiber Channel switch on the storage subsystem into a first virtual port equivalent to the first port; and registering the first port coupled to the Fiber Channel switch of the storage subsystem and the first virtual port into devices coupled to the Fiber Channel switch. These two steps are performed after step S502, and the first virtual port is another port.

Figure 6:
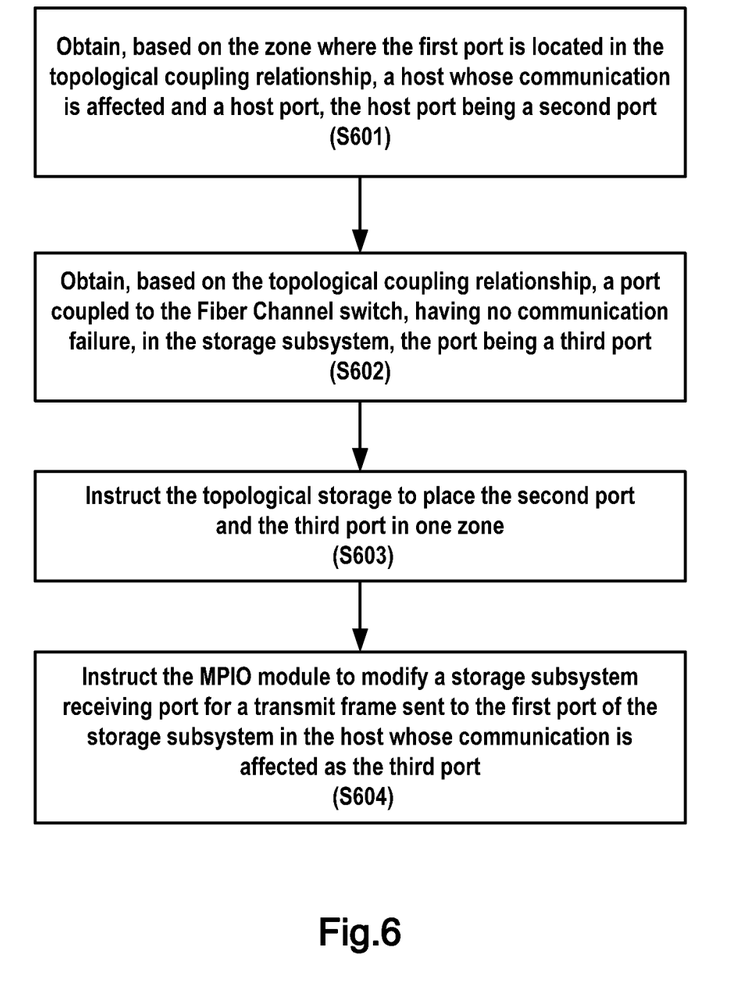
FIG. 6 illustrates a specific embodiment of step S504 of FIG. 5.

FIG. 6 illustrates a specific embodiment of step S504 of FIG. 5. According to FIG. 6, at step S601, a host whose communication is affected and a host port are obtained based on the zone where the first port is located in the topological coupling relationship, this host port being a second port; at step S602, a port, coupled to the Fiber Channel switch, having no communication failure, in the storage subsystem is obtained based on the topological coupling relationship, this port being a third port; at step S603, the topological storage is instructed to put the second port and the third port into one zone; at step S604, the MPIO module is instructed to modify a storage subsystem receiving port for a transmit frame sent to the first port of the storage subsystem in the host whose communication is affected to the third port. Here, if it is obtained, based on the topological coupling relationship, that a plurality of ports, having no communication failure, in the coupling with the Fiber Channel switch exist in the storage subsystem, any port or the port with minimal traffic may be selected as the third port; the third port may also be selected based on other policy.

Figure 7:
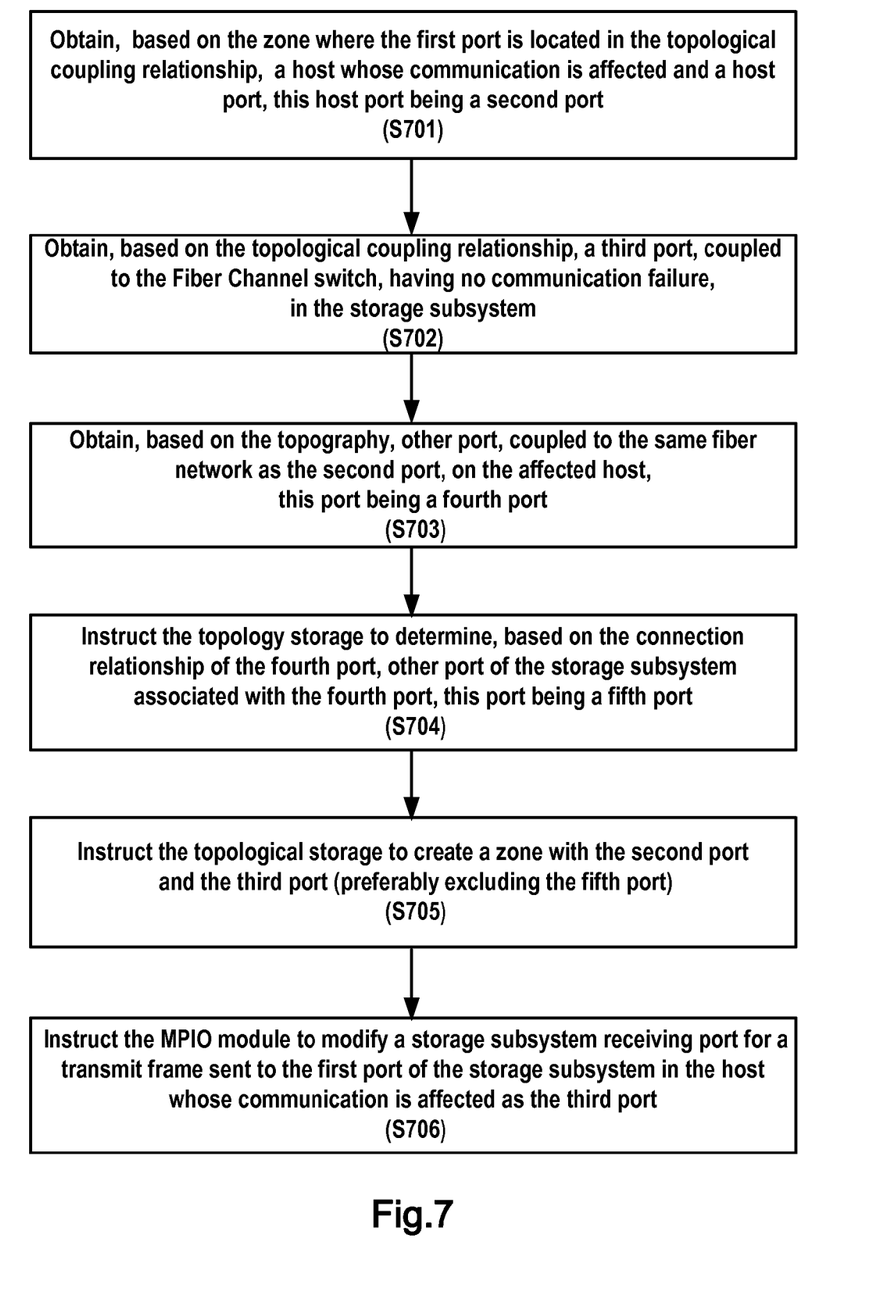
FIG. 7 illustrates another specific embodiment of step S504 of FIG. 5.

FIG. 7 illustrates another specific embodiment of step S504 of FIG. 5. According to FIG. 7, at step S701, a host whose communication is affected and a host port are obtained based on the zone where the first port is located in the topological coupling relationship, this host port being a second port; at step S702, a third port, coupled to the Fiber Channel switch, having no communication failure, in the storage subsystem is obtained based on the topological coupling relationship; at step S703, other port that is coupled to the same Fiber Channel fabric as the second port on the affected host is obtained based on the topological structure, this port being a fourth port; at step S704, the topology storage is instructed to determine, based on the topological relationship of the fourth port, other port of the storage subsystem associated with the fourth port, this other port being a fifth port; at step S705, the topological storage is instructed to create a zone with the second port and the third port (but preferably excluding the fifth port); at step S706, the MPIO module is instructed to modify a storage subsystem receiving port (N port) for a transmit frame sent to the first port of the storage subsystem in the host whose communication is affected to the third port.

In an embodiment, if it is obtained through the topological coupling relationship that a plurality of ports having no communication failure in the coupling with the Fiber Channel switch exist in the storage subsystem, any port may be selected as the third port, or the port with minimal traffic is selected as the third port.

In another embodiment, the storage subsystem may also support the NPIV protocol. If it is obtained through the topological coupling relationship that a plurality of ports having no communication failure in the coupling with the Fiber Channel switch exist in the storage subsystem, any port may be selected as the third port, or the port with minimal traffic is selected as the third port; and a first virtual port is virtualized at the selected port, the first virtual port being the third port.

Although the exemplary embodiments of the present invention are described herein with reference to the drawings, it should be understood that the present invention is not limited to these accurate embodiments, and a person of normal skill in the art can make various modifications to the embodiments without departing from the scope and principles of the present invention. All such variations and modifications are intended to be included in the scope of the present invention as limited in the appended claims.

Moreover, based on the above description, the skilled in the art would appreciate that the present invention may be embodied as an apparatus, a method, or a computer program product. Thus, the present invention may be specifically implemented in the following manners, namely, complete hardware, complete software (including firmware, resident software, microcode, etc), or a combination of software part and hardware part as generally called "circuit," "module," or "system" in this text. Further, the present invention may adopt a form of computer program product as embodied in any tangible medium of expression, wherein the medium comprises computer-available program code.

Any combination of one or more computer-available or computer-readable mediums may be used. The computer-available or computer-readable medium may be for example, but not limited to, electrical, magnetic, optical, electromagnetic, infrared, or semiconductor system, means, device, or propagation medium. More specific examples (non-exhaustive list) of the computer-readable medium comprise the following: an electric connection having one or more leads, a portable computer magnetic disk, hard disk, random access memory (RAM), read-only memory (ROM), erasable programmable read-only memory (EPROM or flash disk), optical Fiber Channel, portable compact disk read-only memory (CD-ROM), optical storage device, a transmission medium for example supporting internet or intranet, or a magnetic storage device. It should be noted that the computer-available or computer readable medium may even be a paper or other suitable medium printed with a program thereon, because the program may be obtained electronically by electrically scanning such paper or other medium, and then compiled, interpreted or processed in a suitable manner, and if necessary, stored in a computer memory. In the context of the present document, a computer-available or computer-readable medium may be any medium containing, storing, communicating, propagating, or transmitting a program available for an instruction execution system, apparatus or device, or associated with the instruction execution system, apparatus, or device. A computer-available medium may comprise a data signal contained in a base band or propagated as a part of carrier and embodying a computer-available program code. A computer-available program code may be transmitted by any suitable medium, including, but not limited to, radio, wire, fiber cable, or RF, etc.

A computer program code for executing operation of the present invention may be complied by any combination of one or more program design languages, the program design languages including object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area network (LAN) or wide area network (WAN), or connected to external computer (for example using an internet service provider via Internet).

Further, each block in the flow charts and/or block diagrams and combination of each block in the flow charts and/or block diagrams of the present invention may be implemented by computer program instructions. These computer program instructions may be provided to a processor of a utility computer, a dedicated computer or other programmable data processing apparatus, to thereby generating a machine such that these instructions executed through the computer or other programmable data processing apparatus generate means for implementing functions/operations prescribed in the blocks of the flow charts and/or block diagrams.

These computer program instructions may also be stored in a computer-readable medium capable of instructing the computer or other programmable data processing apparatus to work in a particular manner, such that the instructions stored in the computer-readable medium generate a product including instruction means for implementing the functions/operations prescribed in the flow charts and/or block diagrams.

The computer program instructions may also be loaded on a computer or other programmable data processing apparatus, such that a series of operation steps are implemented on the computer or other programmable data processing apparatus, to generate a computer-implemented process, such that execution of the instructions on the computer or other programmable apparatus provides a process of implementing the functions/operations prescribed in the blocks of the flow charts and/or block diagrams.

The flowcharts and block in the figures illustrate the system, methods, as well as architecture, functions and operations executable by a computer program product according to the embodiments of the present invention. In this regard, each block in the flowcharts or block may represent a module, a program segment, or a part of code, which contains one or more executable instructions for performing specified logic functions. It should be noted that in some alternative implementations, functions indicated in blocks may occur in an order differing from the order as shown in the figures. For example, two blocks shown consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

The invention claimed is:

1. A method, comprising:
   controlling, by a storage subsystem, data transfer and access to storage devices in a network, wherein the storage subsystem is coupled to a switch and the switch is coupled to a host in the network;
   providing a topological storage coupled to the host, the switch and the storage subsystem, for storing a topological coupling relationship between the host and the switch and a topological coupling relationship between the switch and the storage subsystem;
   in response to determining a failed path between the storage subsystem and the switch coupled to the storage subsystem, determining, by the storage subsystem, a first port on the storage subsystem in the failed path;
   determining, by the storage subsystem, from the topology storage the topological coupling relationship between the host and the switch and the topological coupling relationship between the switch and the storage subsystem; and
   redirecting, by the storage subsystem, based on the topological coupling relationships, a message sent to the first port of the storage subsystem to an operational second port in the storage subsystem coupled to the switch by performing:
      determining, based on a zone in which the first port is located in the topological coupling relationship, a host whose communication is affected and a second port of the host;
      obtaining, based on the topological coupling relationship, a third port in the storage subsystem, having no communication failure, coupled to the switch;
      instructing the topological storage to place the second port and the third port into one zone; and
      instructing the host, whose communication is affected, to modify a storage subsystem receiving port for a transmit frame sent to the first port of the storage subsystem to the third port.

2. The method of claim 1, wherein the network comprises a Storage Area Network, the switch comprises a Fibre Channel switch, and the topological storage is located in a name server and/or management server of the Fiber Channel switch.

3. The method of claim 1, further comprising:
   virtualizing, by the storage subsystem, the first port coupled to the switch on the storage subsystem into a first virtual port equivalent to the first port; and
   registering, by the storage subsystem, the first port and the first virtual port as devices coupled to the switch, wherein the first virtual port is a port on the storage subsystem other than the first port.

4. The method of claim 3, wherein the network comprises a Storage Area Network and the switch comprises a Fibre Channel switch, wherein the storage subsystem implements an N_Port ID Virtualization (NPIV) protocol to perform the virtualizing and includes a storage subsystem registration module for registering the first port coupled to the Fiber Channel switch on the storage subsystem and the first virtual port as devices coupled to the Fiber Channel switch.

5. The method of claim 1, wherein obtaining, based on the topological coupling relationship, the third port coupled to the switch comprises selecting one of the following ports as the third port:
   any port; and
   a port with minimal traffic.

6. The method of claim 1, wherein the network comprises a Storage Area Network and the switch comprises a Fibre Channel switch, wherein the storage subsystem implements an N_Port ID Virtualization (NPIV) protocol, wherein obtaining, based on the topological coupling relationship, the third port comprises selecting any port or a port with minimal traffic as the selected port, and virtualizing another virtual port at the selected port, wherein the virtual port comprises the third port.

7. The method of claim 1, wherein the network comprises a Storage Area Network and the switch comprises a Fibre Channel switch, further comprising:
   creating, by the host, a virtualized port using N_Port ID Virtualization (NPIV) protocol in response to a coupling failure that occurs between one port of the host and one port of the Fiber Channel switch, wherein the virtualized port in the host is coupled to the Fiber Channel switch, and wherein the virtualized port on the host is used to communicate with the Fiber Channel switch.

8. The method of claim 1, wherein the storage subsystem further comprises a monitor module for monitoring whether a coupling failure occurs between the storage subsystem and the switch coupled to the storage subsystem.

* * * * *